Oct. 20, 1925.
F. R. WHITE
1,558,419
PROCESS AND APPARATUS FOR THE FORMATION OF METAL STAMPINGS
Filed May 28, 1923
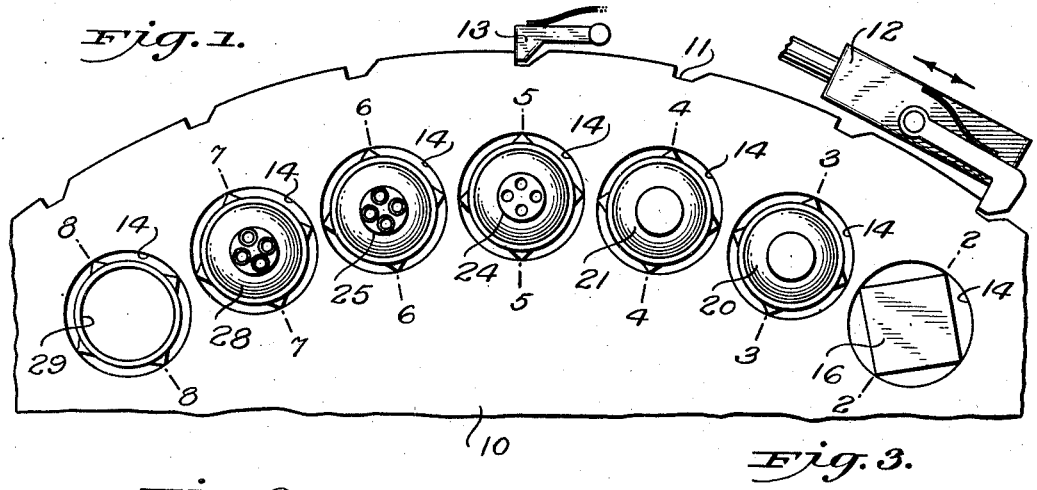
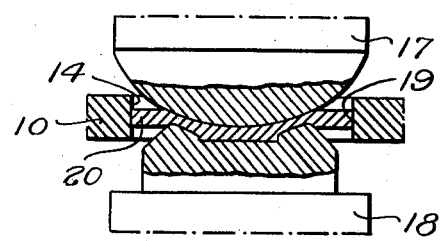
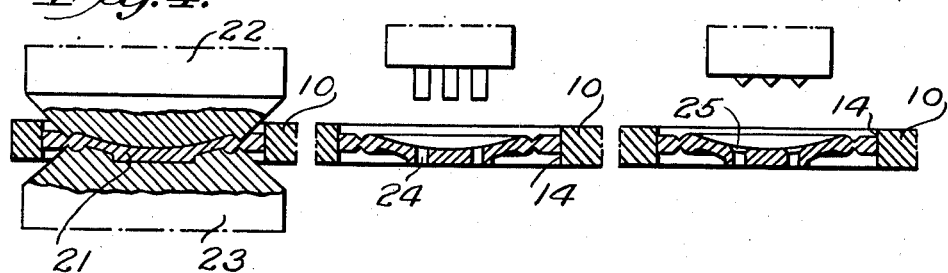
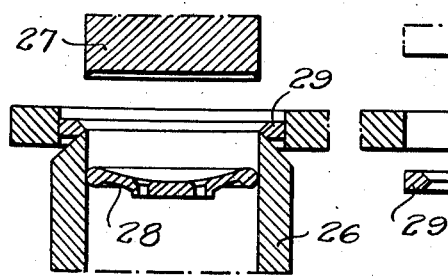
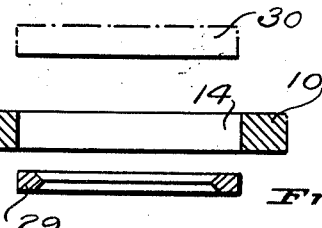
INVENTOR
Franklin R. White
BY
George Cook & Sons
ATTORNEYS Patented Oct. 20, 1925.

1,558,419

UNITED STATES PATENT OFFICE.

FRANKLIN R. WHITE, OF WATERBURY, CONNECTICUT, ASSIGNOR TO THE PATENT BUT-TON COMPANY, OF WATERBURY, CONNECTICUT, A CORPORATION OF CONNECTICUT.

PROCESS AND APPARATUS FOR THE FORMATION OF METAL STAMPINGS.

Application filed May 28, 1923. Serial No. 641,977.

*To all whom it may concern:*

Be it known that I, FRANKLIN R. WHITE, a citizen of the United States, and a resident of Waterbury, in the county of New Haven and State of Connecticut, have made and invented certain new and useful Improvements in Processes and Apparatus for the Formation of Metal Stampings, of which the following is a specification.

My invention relates to a method of manufacturing articles by suitable punches and dies and relates particularly to a process for the rapid manufacture or production of buttons, circular discs and other articles of similar configuration or nature.

An object of the invention is to provide a method of manufacturing buttons and similar articles from sheet metal blanks wherein the scrap resulting from the manufacturing operations will be reduced to a minimum.

A further object is to provide a method of manufacturing metal stampings or punchings such as buttons, wherein the blank is successively moved beneath a series of punches and dies, the latter being all contained within the same press and as each blank is moved forward it is successively operated upon so that after it has traversed the entire series or group of punches and dies it will emerge from the press as a completed article.

A further object is to provide an improved method of supporting and transferring the various blanks from one punch and die set to the next so that the entire operation may be carried out automatically and with considerable facility and despatch, and wherein although the completed article comprehends several intermediate stages for its formation, each successive operation of the press will produce a completed article, and with the foregoing and other objects in view my invention consists in the improved process for manufacturing small stampings or punchings, the various processes and apparatus employed being illustrated in the accompanying drawings and hereinafter described and claimed, it being understood that changes may be made within the scope of what is claimed without departing from the spirit of the invention.

In the accompanying drawings:

Figure 1 is a plan view of a portion of the dial or indexing plate in which the blanks are placed and carried forward through the several stages or series of forming operations;

Figure 2 is a fragmental view taken at the position 2—2 of Figure 1 and illustrating the original blank as fed into one of the openings in the dial plate;

Figure 3 is a view in section taken at the position 3—3 of Figure 1 and illustrating the punch and die operating to form the second stage blank;

Figure 4 is a fragmental view in section taken at the line 4—4 of Figure 1, showing the formation of the third stage blank;

Figure 5 is a fragmental view taken at the position 5—5 of Figure 1 and illustrating the piercing of the holes within the blank for the formation of the fourth stage blank;

Figure 6 is a fragmental view in section taken at the position represented by the line 6—6 of Figure 1 and illustrating the countersinking of the holes for the formation of the fifth stage blank;

Figure 7 is a view taken at the line 7—7, Figure 1, and illustrating the severing of the completed article from the surrounding metal;

Figure 8 is a view in section taken at the line 8—8 of Figure 1 and illustrating the manner in which the scrap metal is ejected from the opening in the dial plate.

Referring specifically to the several views, wherein similar reference numerals designate corresponding parts throughout, a metal plate 10, which I term a dial plate, is pivoted at its center (not shown) so that it may rotate and is provided with a suitable mechanism whereby after each operation of the press in connection with which the dial plate operates, the latter is moved forwardly one step. In order to indicate one manner in which this may be carried out, I have illustrated the dial plate as being provided with notches 11 and in connection with which operates an actuating pawl 12 and a holding pawl 13, the actuating pawl 12 being connected by suitable mechanism (not shown) so that each operation of the press moves the pawl 12 through a predetermined angle and carries the dial plate 10 with it, thus causing an index or turning of the dial plate in a step by step manner.

Arranged near the outer periphery of the dial plate and extending completely therearound are a series of openings or holes 14, spaced apart an angular distance exactly equal to the angular movement of the dial plate at each indexing. The openings 14 are arranged to pass beneath a series of punches and dies, as will presently appear, so that as the blanks are carried forward step by step within the openings 14 they will successively pass beneath each pair of punches and dies and will be formed or shaped thereby. Arranged beneath the dial and at the position 2—2 of Figure 1 is provided a shelf or platform 15 as illustrated in Figure 2 and into the opening 14, which is directly above the platform 15, is inserted either by hand or by means of an automatic feeding mechanism the initial blank 16, the same being of polygonal outline, such as a triangle or square, and preferably of relatively less size across the smaller dimension than the required diameter of the finished article, so as to thereby materially reduce the scrap resulting from the forming operation.

The original or first stage blank 16 fits loosely within the opening 14 and upon the first indexing of the dial plate is carried forward and directly between suitable punch and die blocks 17—18. The operation of the press then brings the die and punch blocks together and causes the metal of the blank 16 to flow outwardly and thus force the corners of the polygonal blank against the side walls of the opening 14 and firmly anchor the blank within the opening and in which position it will remain after the die and punch blocks 17—18 have receded.

As the punch and die blocks 17—18 recede, the dial plate is indexed one step, carrying the second stage blank 20 forwardly between a second set of punch and die blocks 22—23 which are located at the third station indicated by the line 4—4 of Figure 1.

The actuation of the press causes the bringing together of the dies and punches and thus transforms the second stage blank 20 into the third stage blank 21 as illustrated in Figure 4; the punch and die blocks being suitably shaped so that the desired configuration and form will be imparted to the blank. I do not wish to limit myself as to the number of punch and die blocks which may be used, as it will be apparent that this will depend largely upon the nature and configuration of the completed article. As illustrating a further forming of the blanks in Figure 5, I have illustrated a punch so as to form suitable openings 24 in the blank and thus produce what I term the fourth stage blank. In Figure 6 one further indexing forward of the dial plate and one further operation of the punch press results in the openings 24 being countersunk as in 25. A further indexing of the dial brings the fifth stage blank between a hollow die 26 and a cutter 27 and the subsequent operation of the press results in the completed article, in the present instance a button 28 being severed from the adjoining and surrounding metal 29.

The next indexing of the dial plate and the subsequent operation of the press causes the ejector 30 to forcibly remove the scrap 39 from the opening 14 and thereby complete a cycle of operations upon a single blank.

It will be readily understood that while the blank under discussion was being carried forward and successively operated upon, additional first stage blanks were being fed into the openings 14 as the latter reached the position 2—2 of Figure 1, so that the production of finished articles would be continuous and each operation of the press would produce at least one complete article.

I particularly wish to call attention to the feature of providing a blank having protruding corners and of relatively less size than the completed article and subsequently forcing the corners of the blank into contact with the side walls of the opening within the dial plate and thus firmly anchor the blank in position within the dial plate and providing for its subsequent conveyance or transfer to each of the succeeding dies and punches.

Having thus described and explained my invention, I claim and desire to secure by Letters Patent:

1. The method of producing articles by a multi-stage process consisting in introducing within the openings of a dial plate initial stage blanks, forcing the metal of the initial blank against the side walls of the opening to anchor the blank within said openings to thus support the same for further operation, and indexing the dial plate forwardly in a step by step manner to bring the initial blank between suitable forming dies and punches for the formation of the article to the desired configuration and shape.

2. The method of forming articles consisting in introducing within the openings of a dial plate initial blanks having projecting corners, subjecting the initial blank to pressure and forcing the corners into contact with the side walls of the opening and thereby anchoring the blank in position and thereby also supporting the same for further operation and indexing the dial plate forwardly in a step by step manner to thereby bring the blank into proper relation with a series of punches and dies and operating said punches and dies between each of said indexing steps, substantially as described.

3. The method of producing articles by a multi-stage process consisting in introducing within the openings of a plate initial stage blanks and supporting the blanks from beneath within said opening, forcing the metal of the initial blanks against the side walls of the openings to thus suspend the blanks within said openings for further operation, indexing the plate forwardly in a step by step manner while the blanks are suspended to bring the initial blanks between suitable forming dies and punches for the formation of the blanks to the desired configuration and shape.

4. The method of producing articles by a multi-stage process consisting in introducing within openings of a dial plate initial stage blanks of polygonal outline, supporting the blanks within the openings in the initial stage of the process and subjecting the blanks to pressure to thereby change the outline of the blanks and suspend the same within the openings for further operations, indexing the dial plate in a step by step manner to bring the suspended blank between successive punches and dies to thereby shape the blanks to the desired configuration.

5. The method of producing articles by a continuous step process consisting of feeding metal blanks within circular openings of a plate, the blanks being of less dimension than the dimension of the openings in the plate, supporting the blanks from beneath when in the initial opening, and subjecting the blanks to pressure from above and below to cause the metal to flow and anchor for the continuous steps, indexing the plate and subjecting the blanks to shaping, piercing and cutting dies while said blanks are held in suspension within the opening, to thereby continuously produce articles of the desired configuration.

6. The method of forming buttons in a continuous manner consisting in introducing within the openings of a dial plate initial blanks having projecting corners and supporting the blanks within the openings from beneath, subjecting the initial blank to pressure to force the corners into contact with the side wall of the opening to thereby anchor the blank in suspension within said opening, indexing the dial plate forwardly in a step by step manner to thereby bring the blanks into proper relation with a punch and die to shape the button to the desired configuration, indexing the plate and subjecting the blank while still in suspension to a piercing punch and die, indexing the plate to cut the scrap from the blank and indexing the plate so that the scrap will be brought from the initial circular opening.

7. A method of producing metal stampings with a continuous process which consists in feeding metal blanks to an opening in a dial plate, subjecting the blanks to pressure when the same are within the openings and supported from the bottom, thus anchoring the blanks in the opening, the same being unobstructed from beneath and above, indexing said plate and subjecting the blanks to a plurality of operations while the said blanks are held in a suspended position within the openings.

Signed at Waterbury, in the county of New Haven and State of Connecticut, this 21st day of May A. D. 1923.

FRANKLIN R. WHITE.